United States Patent
Guan et al.

(10) Patent No.: US 11,401,375 B2
(45) Date of Patent: Aug. 2, 2022

(54) FLAME-RETARDANT POLYETHER POLYOL AS WELL AS PREPARATION METHOD AND APPLICATION THEREOF

(71) Applicants: Jiahua Science & Technology Development (Shanghai) Ltd., Shanghai (CN); Jiahua Chemicals Inc., Fushun (CN)

(72) Inventors: Yongjian Guan, Fushun (CN); Ping Li, Fushun (CN); Zhijun Li, Fushun (CN); Feng Wang, Fushun (CN); Yubo Li, Fushun (CN)

(73) Assignees: Jiahua Science & Technology Development (Shanghai) Ltd., Shanghai (CN); Jiahua Chemicals Inc., Fushun (CN)

( * ) Notice: Subject to any disclaimer, the term of this patent is extended or adjusted under 35 U.S.C. 154(b) by 339 days.

(21) Appl. No.: 16/686,010

(22) Filed: Nov. 15, 2019

(65) Prior Publication Data

US 2020/0283573 A1    Sep. 10, 2020

(30) Foreign Application Priority Data

Sep. 17, 2018 (CN) ............ 201811082505.1

(51) Int. Cl.
| | | |
|---|---|---|
| *C08G 65/26* | (2006.01) | |
| *C08G 18/26* | (2006.01) | |
| *C08G 18/48* | (2006.01) | |
| *C08K 5/00* | (2006.01) | |
| *C08G 18/50* | (2006.01) | |
| *C08K 5/17* | (2006.01) | |

(52) U.S. Cl.
CPC ..... *C08G 65/2696* (2013.01); *C08G 18/4841* (2013.01); *C08G 18/4845* (2013.01); *C08G 18/5006* (2013.01); *C08G 65/2612* (2013.01); *C08G 65/2624* (2013.01); *C08K 5/0066* (2013.01); *C08K 5/17* (2013.01)

(58) Field of Classification Search
CPC ............ C08G 65/2612; C08G 65/2624; C08G 65/2696; C08G 18/4845; C08G 18/4841; C08G 18/5006
See application file for complete search history.

(56) References Cited

U.S. PATENT DOCUMENTS

| | | | | | |
|---|---|---|---|---|---|
| 3,627,719 | A | * | 12/1971 | Sellet | C08G 18/10 524/315 |
| 4,487,852 | A | * | 12/1984 | Brennan | C08G 14/06 521/167 |
| 4,797,429 | A | * | 1/1989 | Thorpe | C08G 18/5033 521/163 |
| 5,985,965 | A | | 11/1999 | Sicken et al. | |

FOREIGN PATENT DOCUMENTS

| | | |
|---|---|---|
| CN | 101967228 A | 2/2011 |
| CN | 107556448 A | 1/2018 |

OTHER PUBLICATIONS

First Office Action in corresponding CN Patent Application 201811082505.1, dated Aug. 5, 2020, and English Translation thereof, 16 total pages.

Zhang, "Study on the Preparation of New Flame Retardant Polyether Polyol" Thermosetting Resin, vol. 17, No. 6, Nov. 2002, and English Translation thereof, 10 total pages.

\* cited by examiner

*Primary Examiner* — Michael L Leonard

(74) *Attorney, Agent, or Firm* — Armstrong Teasdale LLP

(57) ABSTRACT

A flame-retardant polyether polyol is provided, including a Mannich base and an epoxide. The epoxide is selected from ethylene oxide, propylene oxide and butylene oxide. The Mannich base has a structure represented by a formula (I). In the Mannich base, flame-retardant groups, i.e., halogens are introduced at the second, fourth and sixth positions of a phenyl group, and flame-retardant elements, i.e., halogens and nitrogen are introduced into synthesized polyether polyol. The amount of active hydrogen in the Mannich base is small so that side reactions during synthesis of the polyether polyol are reduced, and the viscosity of the polyether polyol is lowered. A flame-retardant polyurethane material is also provided, synthesized from raw materials comprising the above-mentioned flame-retardant polyether polyol and an isocyanate. Due to autocatalytic performance of tertiary amido in the flame-retardant polyether polyol, use of a catalyst can be reduced and even avoided during the synthesis.

12 Claims, No Drawings

FLAME-RETARDANT POLYETHER POLYOL AS WELL AS PREPARATION METHOD AND APPLICATION THEREOF

CROSS-REFERENCE TO RELATED APPLICATION

This application claims priority benefits to Chinese Patent Application No. 201811082505.1, filed on Sep. 17, 2018. The contents of all of the aforementioned applications are incorporated herein by reference.

TECHNICAL FIELD

The present disclosure belongs to the technical field of macromolecular materials and particularly relates to a flame-retardant polyether polyol as well as a preparation method and application thereof.

BACKGROUND

Polyurethane (PU) materials are shortened forms of polyurethanes, are high molecular synthetic materials, of which principal chains contain more carbamate groups, and are generally prepared through subjecting macromolecular polyols such as polyethers, polyesters and polyolefins to step addition polymerization with polyisocyanate and a diol or diamine chain extender, structures of the PU materials can be described with soft segments and hard segments, the polyols such as the polyethers, the polyesters or the polyolefins form the soft segments, and diisocyanate and the chain extender form the hard segments; and the soft segments provide elasticity, toughness and low-temperature performance for the PU materials, and the hard segments provide hardness, strength and modulus performance for the PU materials. The PU materials are emerging organic macromolecular materials and are praised as fifth plastics. The PU materials are excellent in performance and great in variety of products, and the products are extensively applied to different fields of light industry, chemical industry, electronics, textiles, medical care, architecture, building materials, automobiles, national defense, spaceflight, aviation, etc.

Polyurethane foam (PUF) has a relatively high ratio in the PU materials and is extensively used as a heat-preserving and heat-insulating material of petrochemical pipes, refrigerating equipment, buildings, etc. as the PUF has good physical properties and chemical corrosion resistance and has very high adhesive power with a variety of materials; however, the PUF has a loose and porous structure, the PUF without flame retardant treatment has a limiting oxygen index (LOI) of about 18% and belongs to combustibles, and a great deal of smoke dust and toxic gases will be generated during combustion, so that the flame retardant treatment of the PUF is always a hotspot in researches on the PU materials at present.

At present, flame retarding of the PU materials is mainly divided into 2 kinds: one is an additive flame retardant, and the other one is structural flame-retardant, of which a molecular structure contains a flame-retardant structure, also called reactive flame-retardant. The additive flame retardant will migrate in the materials along with prolongation of use time, and thus, the flame retardance of the materials is lowered; while the reactive flame-retardant has durable flame retardance, so that PU products have higher heat resistance, dimensional stability and strength and the reactive flame-retardant is focuses of researches at present.

Polyether polyols (PPG) are important industrial raw materials for synthesizing the PU materials, and thus, the development of novel polyether polyols with good flame retardance is of far reaching importance in developing the flame retardance of the PU materials.

SUMMARY

Therefore, a technical problem to be solved by the present disclosure is to provide a novel flame-retardant polyether polyol and application thereof in preparation of a flame-retardant polyurethane material.

Thereby, the present disclosure provides a technical solution as follows:

The present disclosure provides a flame-retardant polyether polyol, synthesized from raw materials including a Mannich base and an epoxide, wherein the epoxide is one or more selected from the group consisting of ethylene oxide, propylene oxide and butylene oxide; and wherein the Mannich base has a structure represented by a formula (I):

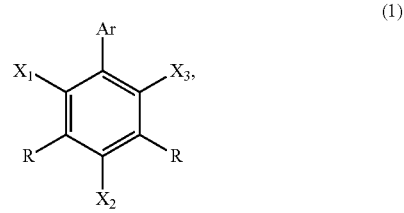

wherein, Ar is hydroxyl or hydroxyl substituted C1~C16 alkyl, R is

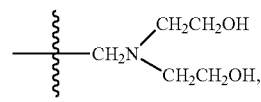

and $X_1$, $X_2$ and $X_3$, independently of each other, represent a halogen.

Optionally, in the above-mentioned flame-retardant polyether polyol, a mole ratio of the Mannich base to the epoxide is 1:(1-200).

Optionally, in the above-mentioned flame-retardant polyether polyol, $X_1$, $X_2$ and $X_3$, independently of each other, represent bromo or chloro.

Optionally, in the above-mentioned flame-retardant polyether polyol, the Mannich base has a structure represented by a formula (II):

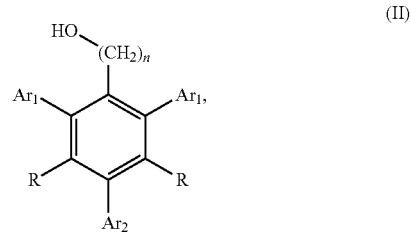

wherein, n is an integer of 1-16, R is
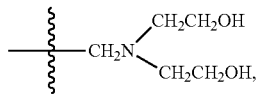
and
Ar₁ and Ar₂, independently of each other, represent bromo or chloro.
Optionally, in the above-mentioned flame-retardant polyether polyol, the Mannich base has a structure represented by any of the following formulae (I-1)-(I-12):
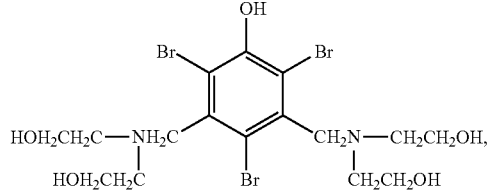
(I-1)
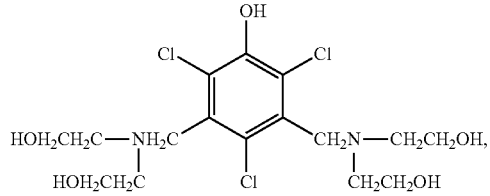
(I-2)
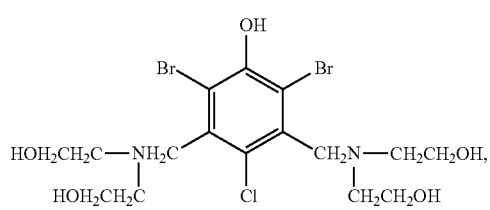
(I-3)
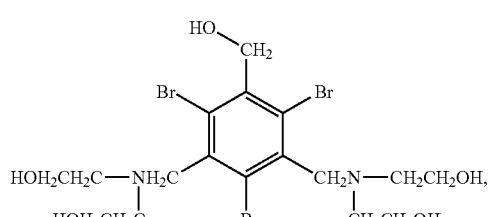
(I-4)
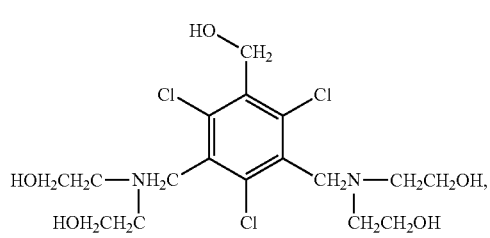
(I-5)
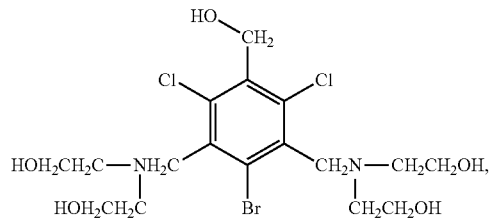
(I-6)
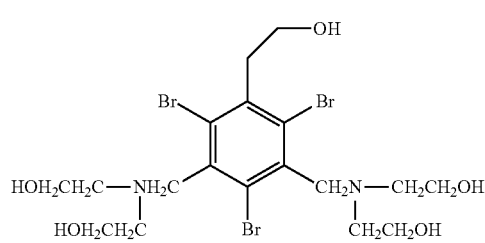
(I-7)
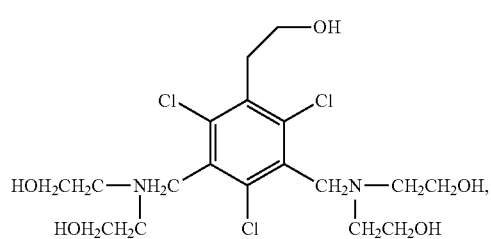
(I-8)
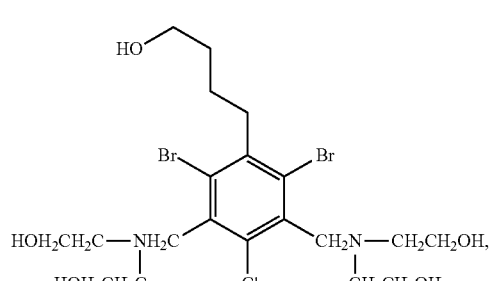
(I-9)
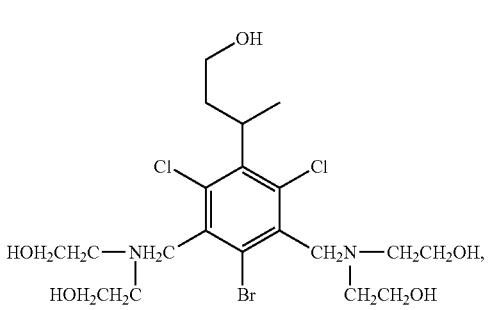
(I-10)

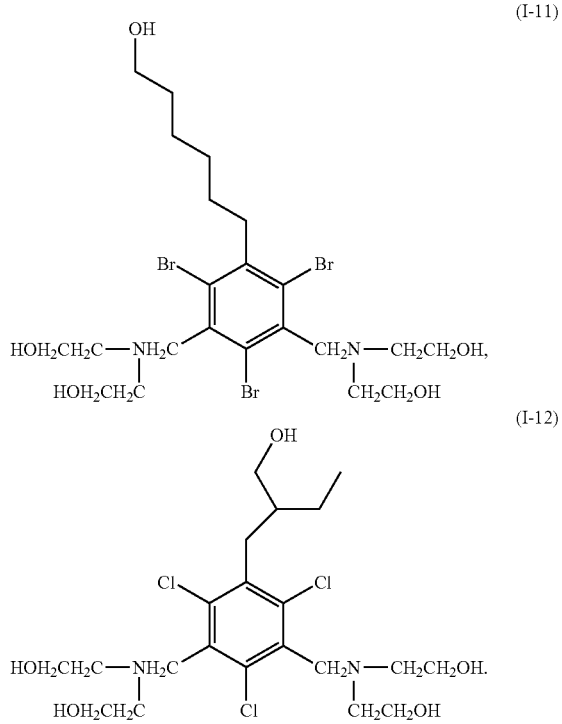

Optionally, in the above-mentioned flame-retardant polyether polyol, the flame-retardant polyether polyol has a hydroxyl value of 20-900 mgKOH/g.

The present disclosure provides a preparation method of the flame-retardant polyether polyol, comprising the following steps:

(1) mixing the Mannich base with a structure represented by the formula (I) with a basic catalyst in an oxygen-free environment to produce a mixture;

(2) performing a polymerization reaction by introducing an epoxide to the mixture to produce a precursor of the flame-retardant polyether polyol; wherein the epoxide is one or more selected from the group consisting of ethylene oxide, propylene oxide and butylene oxide; and (3) dewatering the precursor of the flame-retardant polyether polyol in a vacuum environment, followed by neutralizing treatment to produce the flame-retardant polyether polyol.

Optionally, in the above-mentioned preparation method, the mixture produced in the step (1) by mixing the Mannich base with the basic catalyst in the oxygen-free environment is heated up to a temperature of 80-85° C. to produce a heated mixture, and the epoxide is introduced into the heated mixture to perform the polymerization reaction in the step (2) at a reaction temperature of 85-100° C. for a period of 1-1.5 h; and in the step (3), the precursor of the flame-retardant polyether polyol is dewatered at a temperature of 90-100° C. for a period of 0.5-1 h, and then, glacial acetic acid is added thereto for performing the neutralizing treatment.

Further optionally, in the above-mentioned preparation method, a molar ratio of the Mannich base to the epoxide is 1:(1-200).

The present disclosure provides application of the flame-retardant polyether polyol in a flame-retardant polyurethane material.

The present disclosure provides a flame-retardant polyurethane material, synthesized from raw materials including the above-mentioned flame-retardant polyether polyol and an isocyanate.

Optionally, in the above-mentioned flame-retardant polyurethane material, the flame-retardant polyether polyol accounts for 30-70 parts by mass, and the isocyanate accounts for 125-131.5 parts by mass.

Optionally, in the above-mentioned flame-retardant polyurethane material, in parts by mass, the raw materials of the flame-retardant polyurethane material further include 30-70 parts of non-flame-retardant polyether polyol.

Further optionally, in the above-mentioned flame-retardant polyurethane material, the non-flame-retardant polyether polyol is a polyether polyol prepared by taking sorbitol or saccharose as an initiator.

Optionally, in the above-mentioned flame-retardant polyurethane material, in parts by mass, the raw materials of the flame-retardant polyurethane material further include 1.5-2.5 parts of foam stabilizer, 20-25 parts of foamer and 1.5-2 parts of catalyst.

Further optionally, in the above-mentioned flame-retardant polyurethane material, the catalyst is a tertiary amine catalyst.

Compared with the prior art, the present disclosure has the following advantages:

1. The flame-retardant polyether polyol provided by the present disclosure is synthesized from raw materials including the Mannich base and the epoxide, wherein the epoxide is one or more selected from the group consisting of ethylene oxide, propylene oxide and butylene oxide; and the Mannich base has a structure represented by the formula (I).

In the Mannich base with the structure represented by the formula (I), flame-retardant groups, i.e., halogens are introduced at the second, fourth and sixth positions of the phenyl group. In the structure represented by the formula (I), Ar is hydroxyl or hydroxyl substituted C1~C16 alkyl, an Ar group and/or an R group provide/provides active hydrogen atoms, and thus, the above-mentioned Mannich base can serve as an initiator and copolymerize with the epoxide to synthesize a polyether polyol; and flame-retardant elements, i.e., halogens and nitrogen are introduced into the synthesized polyether polyol, so that the synthesized polyether polyol has good flame retardance.

The synthesized flame-retardant polyether polyol can serve as an industrial raw material of polyurethane and react with an isocyanate to form a urethane bond and a urea bond, flame-retardant groups are introduced into a principal chain of a polyurethane material, the polyurethane material is subjected to soft-segment flame-retardant modification, and the Mannich base with the structure represented by the formula (I) has flame-retardant groups of a high ratio and serves as an initiating raw material, so that the final obtained flame-retardant polyurethane material has flame-retardant elements of high content, and the limiting oxygen index (LOI) of the polyurethane material is remarkably increased. The flame-retardant polyurethane material is a reactive flame-retardant material obtained through introducing the flame-retardant groups into the principal chain, so that the influence on mechanical properties of the polyurethane material is relatively low, the polyurethane material can have both flame retardance and mechanical properties, and great lowering of mechanical properties such as cracking, powdering or compressive deformation is avoided.

Meanwhile, R in the Mannich base is

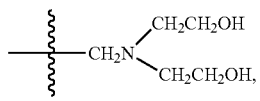

a tertiary amine structure is introduced into the synthesized flame-retardant polyether polyol, and tertiary amine catalysts are catalysts with high performance employed during synthesis of the polyurethane material. The polyether polyol synthesized by the Mannich base with the structure represented by the formula (I) has high flame retardance, and meanwhile, tertiary amido of the Mannich base can catalyze a polymerization reaction between the polyether polyol and an isocyanate, so that the amount of the catalyst required to be used during the synthesis of the polyurethane material is effectively reduced, even, the use of the catalyst is avoided, then, biological toxicity and environmental toxicity during the synthesis of the polyurethane material are lowered, and the environment friendliness of the polyurethane material is improved.

On the other hand, in the Mannich base, halogens are symmetrically introduced at the second, fourth and sixth positions of a phenyl group, active hydrogen on the phenyl group is reduced, the occurrence of side reactions when the Mannich base is applied to the synthesis of substances such as the polyether polyol is effectively reduced, then, dimers or polymers resulting from the side reactions are reduced, the viscosity of the synthesized flame-retardant polyether polyol is lowered, and the problems that all ingredients are non-uniform in mixing during the foaming of a polyurethane foam material due to the viscosity of the flame-retardant polyether polyol and the fluidity of material fluid is poor are avoided.

2. The preparation method of the flame-retardant polyether polyol, provided by the present disclosure, includes the steps: (1) mixing the Mannich base with a structure represented by the formula (I) with a basic catalyst in an oxygen-free environment to produce a mixture; (2) performing a polymerization reaction by introducing an epoxide to the mixture to produce a precursor of the flame-retardant polyether polyol; wherein the epoxide is one or more selected from the group consisting of ethylene oxide, propylene oxide and butylene oxide; and (3) dewatering the precursor of the flame-retardant polyether polyol in a vacuum environment, followed by neutralizing treatment to produce the flame-retardant polyether polyol.

Through the above-mentioned preparation method, in the formula (I), active hydrogen in hydroxyl of an Ar group or hydroxyl of an R group copolymerizes with the epoxide, and a group as follows is produced at a hydroxyl position:

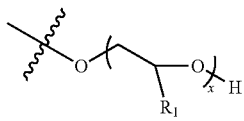

($R_1$ is H, methyl or ethyl), thereby preparing the polyether polyol. Due to halogens and nitrogen in the Mannich base, the synthesized polyether polyol has good flame retardance and is suitable for synthesizing flame-retardant polyurethane materials as a polyether raw material. In addition, the second, fourth and sixth positions of the Mannich base represented by the formula (I) are substituted with the halogens, and active hydrogen of the Mannich base is reduced, so that byproducts during the preparation of the polyether polyol are reduced, and the viscosity of the synthesized flame-retardant polyether polyol is lowered.

3. The flame-retardant polyurethane material provided by the present disclosure is prepared from the above-mentioned flame-retardant polyether polyol and the isocyanate which serve as raw materials, a structural flame retardant material is obtained from the flame-retardant polyether polyol through introducing flame-retardant groups into a principal chain of polyurethane, thus, the polyurethane material can contain high content of flame-retardant ingredients, the lowering of flame retardance during use cannot occur, the use safety of the polyurethane material in the fields of architecture, traffic, etc. is improved, and the requirements on high flame retardant rating are met.

On the other hand, a tertiary amido structure in the flame-retardant polyether polyol has certain autocatalytic performance, so that when the flame-retardant polyether polyol reacts with an isocyanate to produce the flame-retardant polyurethane material, the consumption of the catalyst can be lowered, even, the use of the catalyst can be avoided, the production cost of the flame-retardant polyurethane material is reduced, and the environment friendliness of a synthesis process is improved.

DETAILED DESCRIPTION

Implementation modes of the present disclosure are described below through specific embodiments, unless otherwise mentioned, experimentation methods disclosed in the present disclosure all employ the conventional technologies in this technical field, and reagents and raw materials employed in the embodiments all can be purchased on the market.

In the undermentioned embodiments, an isocyanate employed is polymethylenepolyphenyl polyisocyanate (PM200, Yantai Wanhua), a foam stabilizer is a foam stabilizer for hard foam (Momentive L-6900), a foamer is HCFC-141b (monofluorodichloroethane), a polyether polyol taking saccharose as an initiator is Puranol RF 4110 (Shanghai Jiahua), and a polyether polyol taking sorbitol as an initiator is Puranol RF 451 (Shanghai Jiahua).

Embodiment 1

The present embodiment provides a Mannich base with a structure represented by a formula (I-1) as follows:

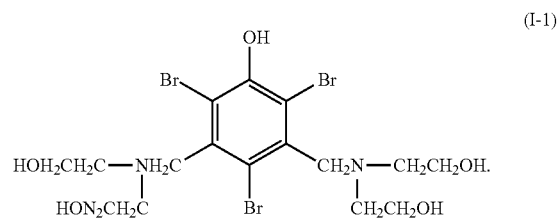

The Mannich base represented by the formula (I-1) is prepared through the following steps:

(1) adding 52.6 g of diethanolamine into a 250 mL round-bottomed flask, stirring, and heating up to a temperature of 40-45° C.; and then, adding 15 g of paraformaldehyde (molecular weight: 30) into the flask in four batches in a manner that the feeding time interval of each batch is 15 min and a temperature is controlled to be 50-55° C. during feeding of the paraformaldehyde;

After the paraformaldehyde is added completely, continuing to perform a reaction for a period of 3 h at a temperature of 50° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to 0.5%; and (2) cooling down to a temperature of 60-65° C., and adding 83 g of 2,4,6-tribromophenol (a phenyl compound represented by a formula (I'-1)) into the 3-hydroxyethyl-1,3-oxazolidine in 2 h in 3-4 batches; and after adding is completed, continuing to perform a reaction for a period of 2.5 h at a temperature of 80° C., thereby preparing the Mannich base represented by the formula (I-1).

A reaction route is shown as follows:

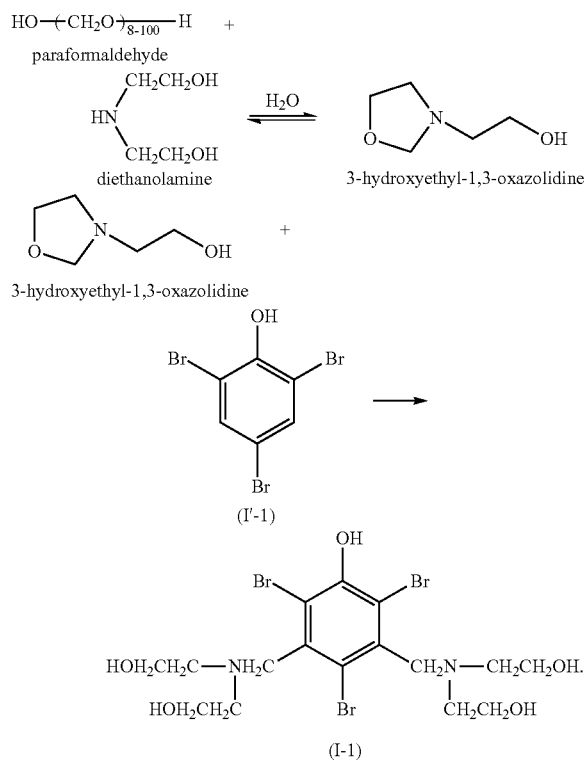

Embodiment 2

The present embodiment provides a Mannich base with a structure represented by a formula (I-2) as follows:

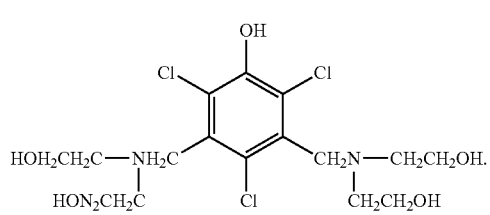

The Mannich base represented by the formula (I-2) is prepared through the following steps:

(1) adding 56.5 g of diethanolamine into a 250 mL round-bottomed flask, stirring, and heating up to a temperature of 40-45° C.; and then, adding 15 g of paraformaldehyde (molecular weight: 30) into the flask in four batches in a manner that the feeding time interval of each batch is 15 min and a temperature is controlled to be 55-60° C. during feeding of the paraformaldehyde;

After the paraformaldehyde is added completely, continuing to perform a reaction for a period of 3 h at a temperature of 55° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to 0.5%; and (2) cooling down to a temperature of 60-65° C., and adding 49.4 g of 2,4,6-trichlorophenol (a phenyl compound represented by a formula (I'-2)) into the 3-hydroxyethyl-1,3-oxazolidine in 2 h in 3-4 batches; and after adding is completed, continuing to perform a reaction for a period of 3 h at a temperature of 80° C., thereby preparing the Mannich base represented by the formula (I-2).

A reaction route is shown as follows:

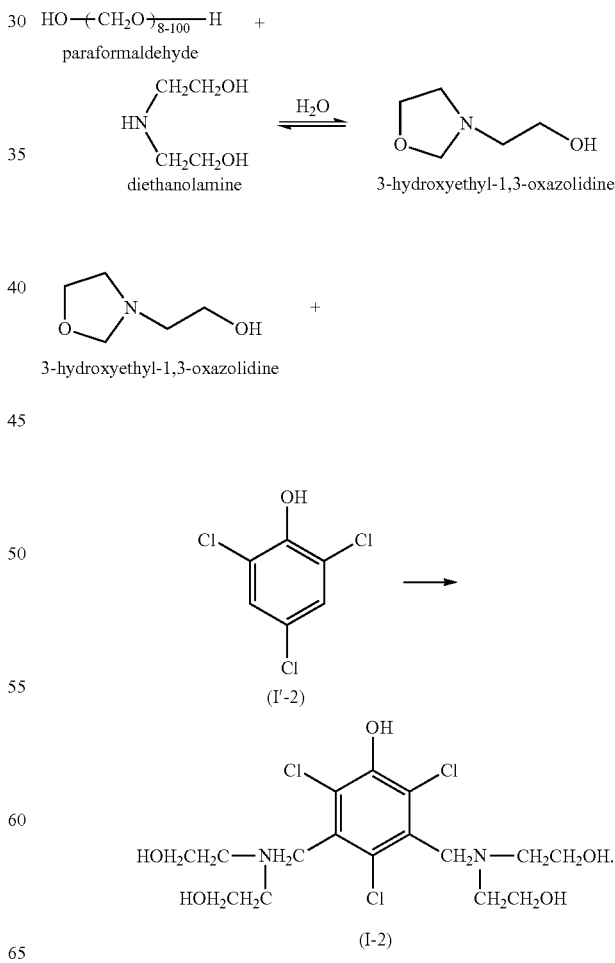

Embodiment 3

The present embodiment provides a Mannich base with a structure represented by a formula (I-3) as follows:

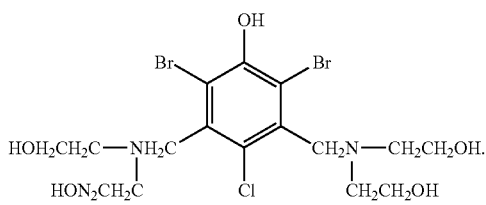

The Mannich base represented by the formula (I-3) is prepared through the following steps:

(1) adding 52.6 g of diethanolamine into a 250 mL round-bottomed flask, stirring, and heating up to a temperature of 40-45° C.; and then, adding 15.75 g of paraformaldehyde (molecular weight: 30) into the flask in four batches in a manner that the feeding time interval of each batch is 15 min and a temperature is controlled to be 50-55° C. during feeding of the paraformaldehyde;

After the paraformaldehyde is added completely, continuing to perform a reaction for a period of 3 h at a temperature of 55° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to or less than 0.5%; and (2) cooling down to a temperature of 60-65° C., and adding 71.6 g of 2,6-dibromo-4-chlorophenol (a phenyl compound represented by a formula (I'-3)) into the 3-hydroxyethyl-1,3-oxazolidine in 2 h in 3-4 batches; and after adding is completed, continuing to perform a reaction for a period of 3 h at a temperature of 85° C., thereby preparing the Mannich base represented by the formula (I-3).

A reaction route is shown as follows:

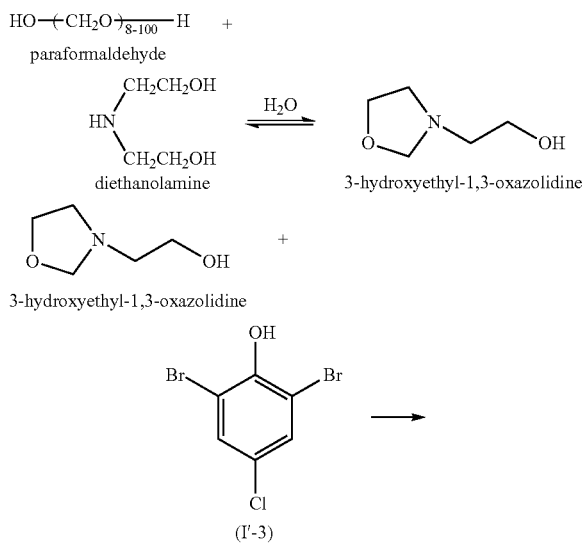

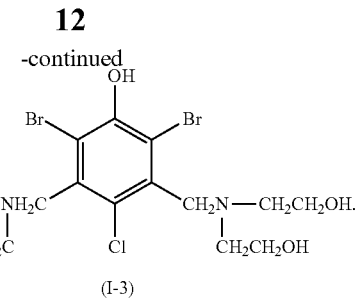

Embodiment 4

The present embodiment provides a Mannich base with a structure represented by a formula (I-4) as follows:

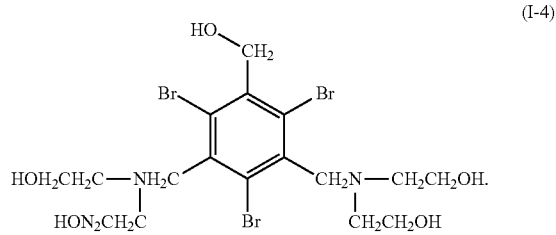

The Mannich base represented by the formula (I-4) is prepared through the following steps:

(1) adding 56.5 g of diethanolamine into a 250 mL round-bottomed flask, stirring, and heating up to a temperature of 40-45° C.; and then, adding 15.75 g of paraformaldehyde (molecular weight: 30) into the flask in four batches in a manner that the feeding time interval of each batch is 15 min and a temperature is controlled to be 55-60° C. during feeding of the paraformaldehyde;

After the paraformaldehyde is added completely, continuing to perform a reaction for a period of 3 h at a temperature of 60° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to 0.5%; and (2) cooling down to a temperature of 60-65° C., and adding 86.2 g of 2,4,6-tribromobenzalcohol (a phenyl compound represented by a formula (I'-4)) into the 3-hydroxyethyl-1,3-oxazolidine in 2 h in 3-4 batches; and after adding is completed, continuing to perform a reaction for a period of 2.5 h at a temperature of 80° C., thereby preparing the Mannich base represented by the formula (I-4).

A reaction route is shown as follows:

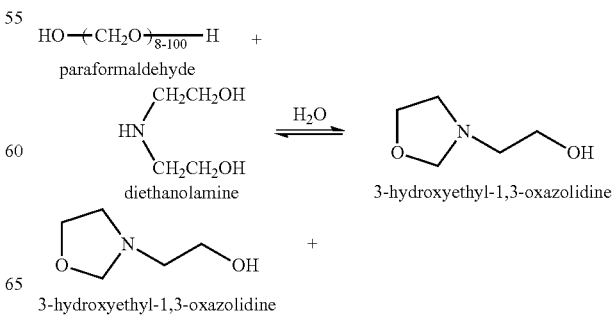

-continued

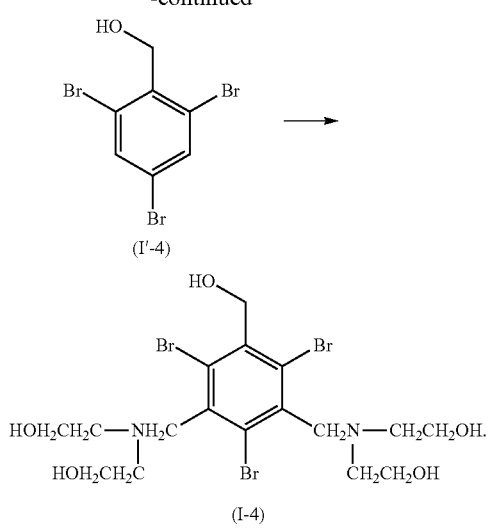
(I'-4)

(I-4)

Embodiment 5

The present embodiment provides a Mannich base with a structure represented by a formula (I-5) as follows:

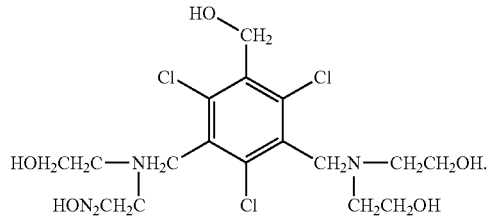
(I-5)

The Mannich base represented by the formula (I-5) is prepared through the following steps:

(1) adding 52.6 g of diethanolamine into a 250 mL round-bottomed flask, stirring, and heating up to a temperature of 40-45° C.; and then, adding 15 g of paraformaldehyde (molecular weight: 30) into the flask in four batches in a manner that the feeding time interval of each batch is 15 min and a temperature is controlled to be 50-55° C. during feeding of the paraformaldehyde;

After the paraformaldehyde is added completely, continuing to perform a reaction for a period of 3 h at a temperature of 55° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to 0.5%; and (2) cooling down to a temperature of 60-65° C., and adding 52.9 g of 2,4,6-trichlorobenzalcohol (a phenyl compound represented by a formula (I'-5)) into the 3-hydroxyethyl-1,3-oxazolidine in 2 h in 3-4 batches; and after adding is completed, continuing to perform a reaction for a period of 2.5 h at a temperature of 85° C., thereby preparing the Mannich base represented by the formula (I-5).

A reaction route is shown as follows:

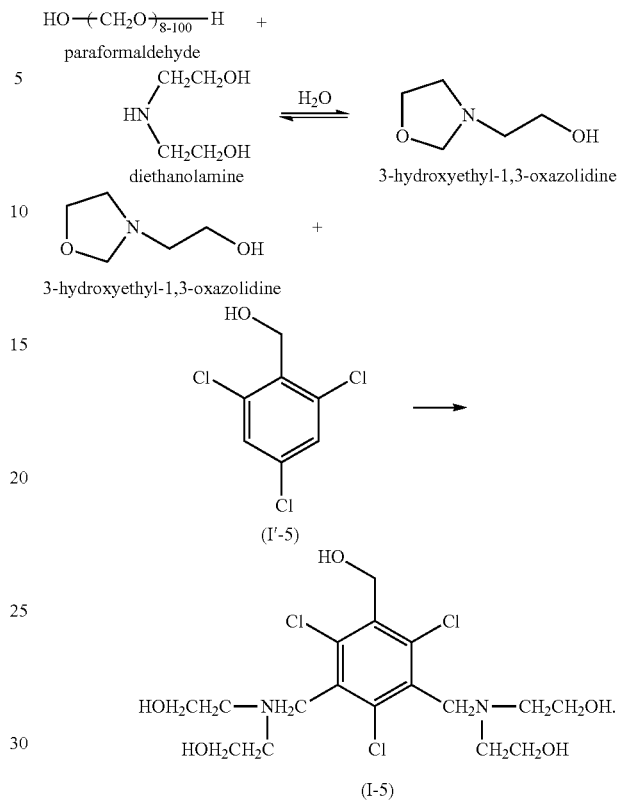

Embodiment 6

The present embodiment provides a Mannich base with a structure represented by a formula (I-6) as follows:

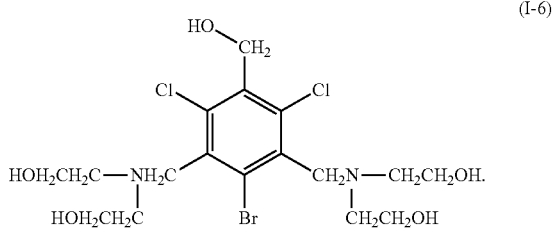
(I-6)

The Mannich base represented by the formula (I-6) is prepared through the following steps:

(1) adding 52.6 g of diethanolamine into a 250 mL round-bottomed flask, stirring, and heating up to a temperature of 40-45° C.; and then, adding 15 g of paraformaldehyde (molecular weight: 30) into the flask in four batches in a manner that the feeding time interval of each batch is 15 min and a temperature is controlled to be 50-60° C. during feeding of the paraformaldehyde;

After the paraformaldehyde is added completely, continuing to perform a reaction for a period of 3 h at a temperature of 50° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to or less than 0.5%; and (2) cooling down to a temperature of 60-65° C., and adding 63.98 g of 2,6-dichloro-4-bromobenzalcohol (a phenyl compound represented by a formula (I'-6)) into the 3-hydroxyethyl-1,3-oxazolidine in 2 h in 3-4 batches; and after adding is completed, continuing to perform a reaction for a period of 3 h at a temperature of 80° C., thereby preparing the Mannich base represented by the formula (I-6).

A reaction route is shown as follows:

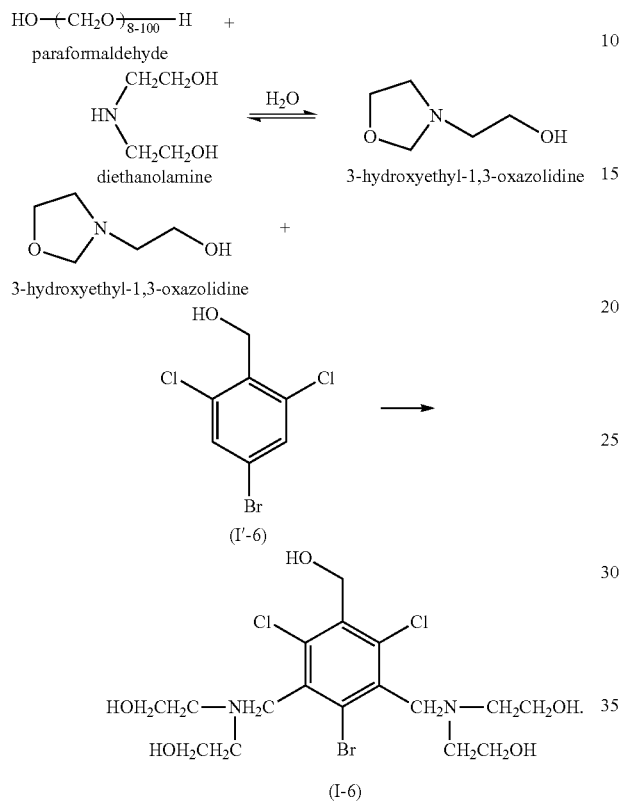

(I-6)

Embodiment 7

The present embodiment provides a Mannich base with a structure represented by a formula (I-7) as follows:

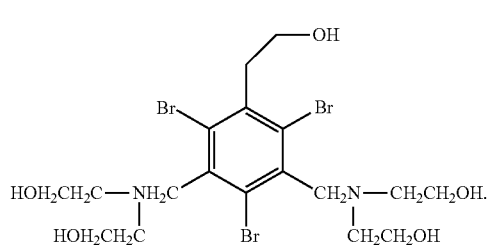

(I-7)

The Mannich base represented by the formula (I-7) is prepared through the following steps:

(1) adding 52.6 g of diethanolamine into a 250 mL round-bottomed flask, stirring, and heating up to a temperature of 40-45° C.; and then, adding 30 g of paraformaldehyde (molecular weight: 60) into the flask in four batches in a manner that the feeding time interval of each batch is 15 min and a temperature is controlled to be 50-58° C. during feeding of the paraformaldehyde;

After the paraformaldehyde is added completely, continuing to perform a reaction for a period of 3 h at a temperature of 58° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to or less than 0.5%; and (2) cooling down to a temperature of 60-65° C., and adding 89.7 g of 2-(2,4,6-tribromophenyl)-ethanol (a phenyl compound represented by a formula (I'-7)) into the 3-hydroxyethyl-1,3-oxazolidine in 2 h in 3-4 batches; and after adding is completed, continuing to perform a reaction for a period of 2.5 h at a temperature of 80° C., thereby preparing the Mannich base represented by the formula (I-7).

A reaction route is shown as follows:

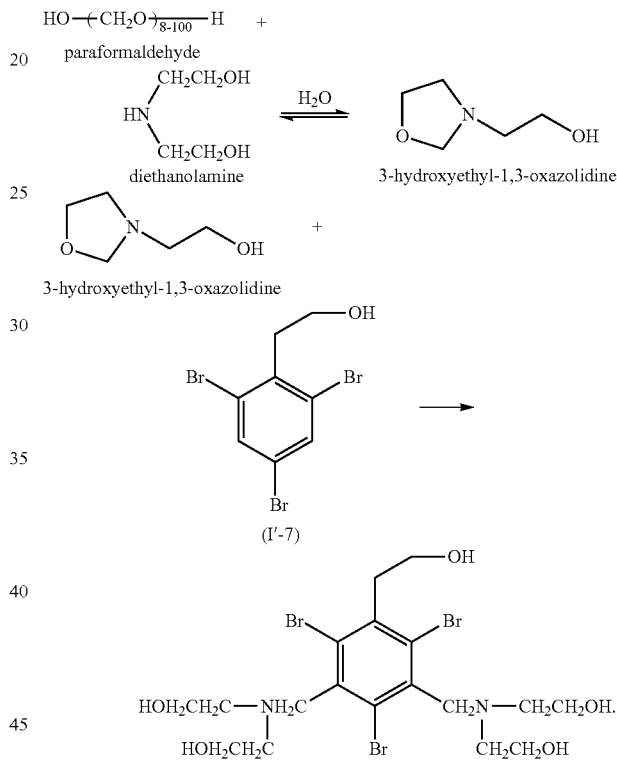

(I-7)

Embodiment 8

The present embodiment provides a Mannich base with a structure represented by a formula (I-8) as follows:

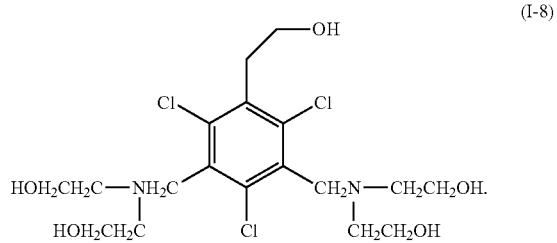

(I-8)

The Mannich base represented by the formula (I-8) is prepared through the following steps:

(1) adding 52.6 g of diethanolamine into a 250 mL round-bottomed flask, stirring, and heating up to a temperature of 40-45° C.; and then, adding 15 g of paraformaldehyde (molecular weight: 30) into the flask in four batches in a manner that the feeding time interval of each batch is 15 min and a temperature is controlled to be 54-58° C. during feeding of the paraformaldehyde;

After the paraformaldehyde is added completely, continuing to perform a reaction for a period of 3 h at a temperature of 55° C. to produce 3-hydroxyethyl-1,3-oxazolidine; and Heating up to a temperature of 100° C., and subjecting the produced 3-hydroxyethyl-1,3-oxazolidine to depressurized dewatering to enable the 3-hydroxyethyl-1,3-oxazolidine has a moisture content of equal to or less than 0.5%; and (2) cooling down to a temperature of 60-65° C., and adding 56.4 g of 2-(2,4,6-trichlorophenyl)-ethanol (a phenyl compound represented by a formula (I'-8)) into the 3-hydroxyethyl-1,3-oxazolidine in 2 h in 3-4 batches; and after adding is completed, continuing to perform a reaction for a period of 2.5 h at a temperature of 83° C., thereby preparing the Mannich base represented by the formula (I-8).

A reaction route is shown as follows:

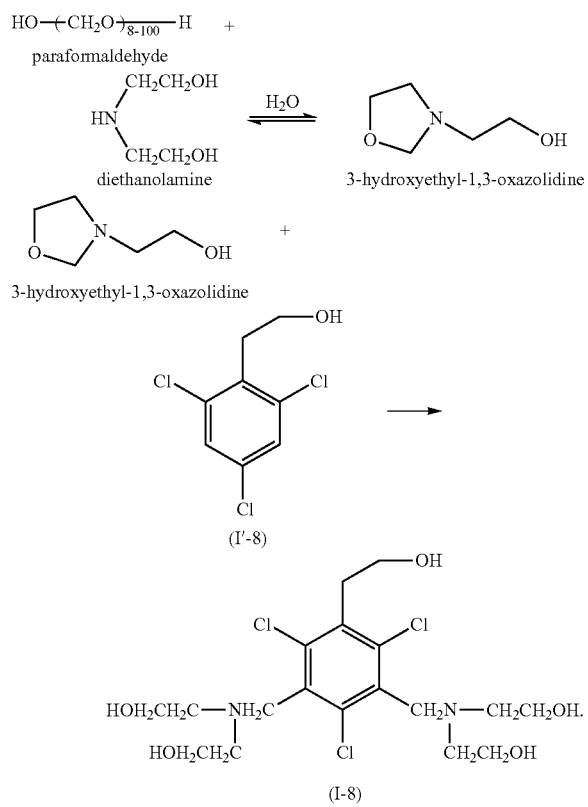

Embodiment 9

The present embodiment provides a flame-retardant polyether polyol. The flame-retardant polyether polyol is synthesized from raw materials including a Mannich base and ethylene oxide, wherein the Mannich base has a structure represented by a formula (I-1):

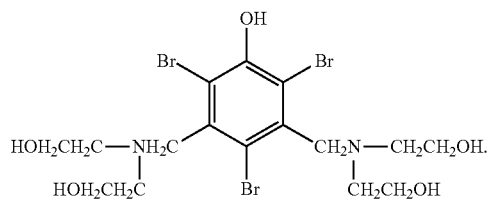

A preparation method of the flame-retardant polyether polyol includes the following steps:

(1) adding 11.2 g of the Mannich base with a structure represented by the formula (I-1) into an autoclave, performing vacuumizing and nitrogen gas replacement for 3 times, adding a catalyst KOH, and stirring uniformly; and increasing a temperature in the autoclave to 80° C., then, introducing ethylene oxide while controlling a pressure to be 0.2 MPa and controlling a temperature to be 103±+2° C., and closing the ethylene oxide in 0.5 h~1 h;

(2) after the introducing of the ethylene oxide is completed, continuing to control the temperature in the autoclave to be 85° C., stirring for a period of 1 h, and subjecting the Mannich base with the structure represented by the formula (I-1) and the ethylene oxide to a reaction to produce a precursor of the flame-retardant polyether polyol; and (3) subjecting the precursor of the flame-retardant polyether polyol obtained in the step (2) to vacuum dewatering for a period of 0.5 h at a temperature of 90° C., cooling down, and adding glacial acetic acid for neutralization, thereby obtaining the flame-retardant polyether polyol with a hydroxyl value of 470~490 mgKOH/g and a viscosity of 10000~15000.

Embodiment 10

The present embodiment provides a flame-retardant polyether polyol. The flame-retardant polyether polyol is synthesized from raw materials including a Mannich base and propylene oxide, wherein the Mannich base has a structure represented by a formula (I-2):

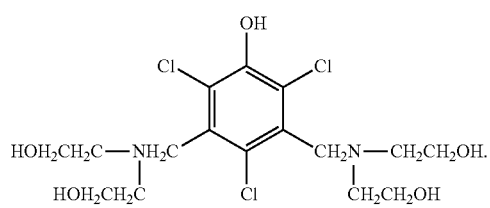

A preparation method of the flame-retardant polyether polyol includes the following steps:

(1) adding 10 g of the Mannich base with a structure represented by the formula (I-2) into an autoclave, performing vacuumizing and nitrogen gas replacement for 3 times, adding a catalyst KOH, and stirring uniformly; increasing a temperature in the autoclave to 85° C., then, introducing propylene oxide while controlling a pressure to be 0.2 MPa and controlling a temperature to be 103±+2° C., and closing the ethylene oxide in 0.5 h; and introducing propylene oxide while controlling a pressure to be 0.2 MPa and controlling a temperature to be 103±+2° C., and closing the propylene oxide in 0.5 h;

(2) after the introducing of a mixed monomer is completed, continuing to control the temperature in the autoclave to be 100° C., stirring for a period of 1 h, and subjecting the Mannich base with the structure represented by the formula (I-2) and the propylene oxide to a reaction to produce a precursor of the flame-retardant polyether polyol; and (3) subjecting the precursor of the flame-retardant polyether polyol obtained in the step (2) to vacuum dewatering for a period of 0.5 h at a temperature of 100° C., cooling down, and adding glacial acetic acid for neutralization, thereby obtaining the flame-retardant polyether polyol with a hydroxyl value of 430~470 mgKOH/g and a viscosity of 10000~15000.

Embodiment 11

The present embodiment provides a flame-retardant polyether polyol. The flame-retardant polyether polyol is synthesized from raw materials including a Mannich base and ethylene oxide, wherein the Mannich base has a structure represented by a formula (I-3):

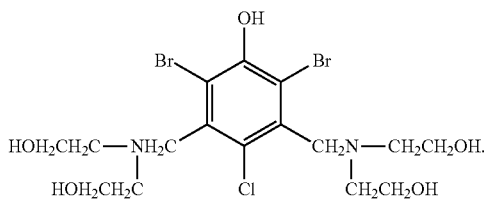

(I-3)

A preparation method of the flame-retardant polyether polyol includes the following steps:

(1) adding 11 g of the Mannich base with a structure represented by the formula (I-3) into an autoclave, performing vacuumizing and nitrogen gas replacement for 3 times, adding a catalyst KOH, and stirring uniformly; and increasing a temperature in the autoclave to 80° C., then, introducing ethylene oxide while controlling a pressure to be 0.2 MPa and controlling a temperature to be 103±2° C., and closing the ethylene oxide in 0.5 h~1 h;

(2) after the introducing of the ethylene oxide is completed, continuing to control the temperature in the autoclave to be 85° C., stirring for a period of 1.5 h, and subjecting the Mannich base with the structure represented by the formula (I-3) and the ethylene oxide to a reaction to produce a precursor of the flame-retardant polyether polyol; and (3) subjecting the precursor of the flame-retardant polyether polyol obtained in the step (2) to vacuum dewatering for a period of 1 h at a temperature of 90° C., cooling down, and adding glacial acetic acid for neutralization, thereby obtaining the flame-retardant polyether polyol with a hydroxyl value of 450~480 mgKOH/g and a viscosity of 10000~15000.

Embodiment 12

The present embodiment provides a flame-retardant polyether polyol. The flame-retardant polyether polyol is synthesized from raw materials including a Mannich base and ethylene oxide, wherein the Mannich base has a structure represented by a formula (I-4):

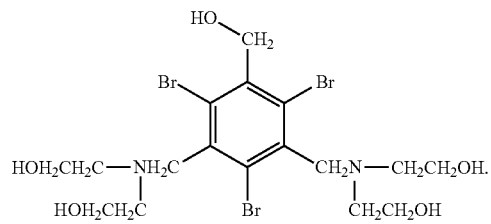

(I-4)

A preparation method of the flame-retardant polyether polyol includes the following steps:

(1) adding 12 g of the Mannich base with a structure represented by the formula (I-4) into an autoclave, performing vacuumizing and nitrogen gas replacement for 3 times, adding a catalyst KOH, and stirring uniformly; and increasing a temperature in the autoclave to 85° C., then, introducing ethylene oxide while controlling a pressure to be 0.2 MPa and controlling a temperature to be 103±2° C., and closing the ethylene oxide in 0.5 h~1 h;

(2) after the introducing of the ethylene oxide is completed, continuing to control the temperature in the autoclave to be 95° C., stirring for a period of 1.5 h, and subjecting the Mannich base with the structure represented by the formula (I-4) and the ethylene oxide to a reaction to produce a precursor of the flame-retardant polyether polyol; and (3) subjecting the precursor of the flame-retardant polyether polyol obtained in the step (2) to vacuum dewatering for a period of 0.8 h at a temperature of 95° C., cooling down, and adding glacial acetic acid for neutralization, thereby obtaining the flame-retardant polyether polyol with a hydroxyl value of 450~480 mgKOH/g and a viscosity of 10000~15000.

Embodiment 13

The present embodiment provides a flame-retardant polyether polyol. The flame-retardant polyether polyol is synthesized from raw materials including a Mannich base and ethylene oxide, wherein the Mannich base has a structure represented by a formula (I-5):

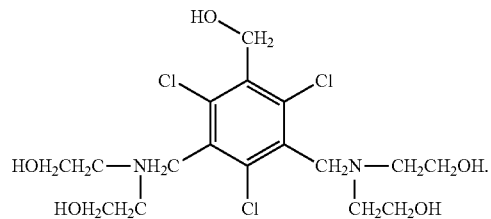

(I-5)

A preparation method of the flame-retardant polyether polyol includes the following steps:

(1) adding 11 g of the Mannich base with a structure represented by the formula (I-5) into an autoclave, performing vacuumizing and nitrogen gas replacement for 3 times, adding a catalyst KOH, and stirring uniformly; and increasing a temperature in the autoclave to 80° C., then, introducing ethylene oxide while controlling a pressure to be 0.2 MPa and controlling a temperature to be 103±2° C., and closing the ethylene oxide in 0.5 h~1 h;

(2) after the introducing of the ethylene oxide is completed, continuing to control the temperature in the autoclave to be 100° C., stirring for a period of 1 h, and subjecting the Mannich base with the structure represented by the formula (I-5) and the ethylene oxide to a reaction to produce a precursor of the flame-retardant polyether polyol; and (3) subjecting the precursor of the flame-retardant polyether polyol obtained in the step (2) to vacuum dewatering for a period of 1 h at a temperature of 90° C., cooling down, and adding glacial acetic acid for neutralization, thereby obtaining the flame-retardant polyether polyol with a hydroxyl value of 450~480 mgKOH/g and a viscosity of 10000~15000.

Embodiment 14

The present embodiment provides a flame-retardant polyether polyol. The flame-retardant polyether polyol is synthesized from raw materials including a Mannich base and propylene oxide, wherein the Mannich base has a structure represented by a formula (I-6):

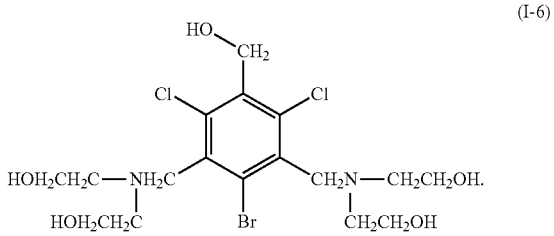

(I-6)

A preparation method of the flame-retardant polyether polyol includes the following steps:

(1) adding 11.5 g of the Mannich base with a structure represented by the formula (I-6) into an autoclave, performing vacuumizing and nitrogen gas replacement for 3 times, adding a catalyst KOH, and stirring uniformly; and increasing a temperature in the autoclave to 80° C., then, introducing propylene oxide while controlling a pressure to be 0.2 MPa and controlling a temperature to be 103±2° C., and closing the propylene oxide in 0.5 h~1 h;

(2) after the introducing of the propylene oxide is completed, continuing to control the temperature in the autoclave to be 85° C., stirring for a period of 1.5 h, and subjecting the Mannich base with the structure represented by the formula (I-6) and the propylene oxide to a reaction to produce a precursor of the flame-retardant polyether polyol; and (3) subjecting the precursor of the flame-retardant polyether polyol obtained in the step (2) to vacuum dewatering for a period of 0.5 h at a temperature of 100° C., cooling down, and adding glacial acetic acid for neutralization, thereby obtaining the flame-retardant polyether polyol with a hydroxyl value of 460~485 mgKOH/g and a viscosity of 10000~15000.

Embodiment 15

The present embodiment provides a flame-retardant polyether polyol. The flame-retardant polyether polyol is synthesized from raw materials including a Mannich base and ethylene oxide, wherein the Mannich base has a structure represented by a formula (I-7):

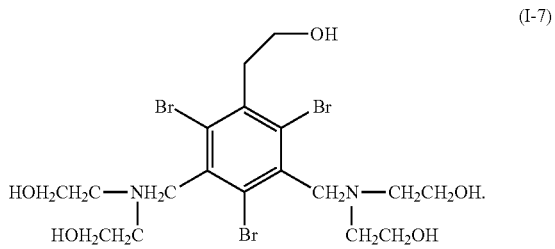

(I-7)

A preparation method of the flame-retardant polyether polyol includes the following steps:

(1) adding 13 g of the Mannich base with a structure represented by the formula (I-7) into an autoclave, performing vacuumizing and nitrogen gas replacement for 3 times, adding a catalyst KOH, and stirring uniformly; and increasing a temperature in the autoclave to 80° C., then, introducing ethylene oxide while controlling a pressure to be 0.2 MPa and controlling a temperature to be 103±2° C., and closing the ethylene oxide in 0.5 h~1 h;

(2) after the introducing of the ethylene oxide is completed, continuing to control the temperature in the autoclave to be 85° C., stirring for a period of 1 h, and subjecting the Mannich base with the structure represented by the formula (I-7) and the ethylene oxide to a reaction to produce a precursor of the flame-retardant polyether polyol; and (3) subjecting the precursor of the flame-retardant polyether polyol obtained in the step (2) to vacuum dewatering for a period of 0.5 h at a temperature of 90° C., cooling down, and adding glacial acetic acid for neutralization, thereby obtaining the flame-retardant polyether polyol with a hydroxyl value of 460~490 mgKOH/g and a viscosity of 10000~15000.

Embodiment 16

The present embodiment provides a flame-retardant polyether polyol. The flame-retardant polyether polyol is synthesized from raw materials including a Mannich base and ethylene oxide, wherein the Mannich base has a structure represented by a formula (I-8):

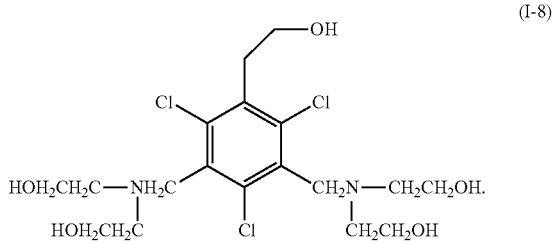

(I-8)

A preparation method of the flame-retardant polyether polyol includes the following steps:

(1) adding 12 g of the Mannich base with a structure represented by the formula (I-8) into an autoclave, performing vacuumizing and nitrogen gas replacement for 3 times, adding a catalyst KOH, and stirring uniformly; and increasing a temperature in the autoclave to 80° C., then, introducing ethylene oxide while controlling a pressure to be 0.2 MPa and controlling a temperature to be 103±2° C., and closing the ethylene oxide in 0.5 h~1 h;

(2) after the introducing of the ethylene oxide is completed, continuing to control the temperature in the autoclave to be 85° C., stirring for a period of 1 h, and subjecting the Mannich base with the structure represented by the formula (I-8) and the ethylene oxide to a reaction to produce a precursor of the flame-retardant polyether polyol; and (3) subjecting the precursor of the flame-retardant polyether polyol obtained in the step (2) to vacuum dewatering for a period of 0.5 h at a temperature of 90° C., cooling down, and adding glacial acetic acid for neutralization, thereby obtaining the flame-retardant polyether polyol with a hydroxyl value of 470~495 mgKOH/g and a viscosity of 10000~15000.

Embodiment 17

The present embodiment provides a flame-retardant polyurethane material. In parts by mass, a component A of raw materials for synthesizing the flame-retardant polyurethane material includes:

70 parts of the flame-retardant polyether polyol prepared in the embodiment 9, 30 parts of polyether polyol taking saccharose as an initiator, 2.5 parts of foam stabilizer, 2 parts of water, 20 parts of foamer and 1.5 parts of catalyst (N,N-dimethylbenzylamine); and A component B includes 126 parts of isocyanate.

The flame-retardant polyurethane material is prepared through the following method:

Weighing a certain amount of the component A, and placing the component A in a plastic cup; and weighing an isocyanate as the component B according to a raw material proportioning ratio, and placing the component B in another plastic cup. Rapidly pouring the component B into just-uniformly-stirred component A, continuing to rapidly stir for a period of 5-10 s, recording the reaction time, aging for a period of 24 h at normal temperature, and testing properties.

Embodiment 18

The present embodiment provides a flame-retardant polyurethane material. In parts by mass, a component A of raw materials for synthesizing the flame-retardant polyurethane material includes:

60 parts of the flame-retardant polyether polyol prepared in the embodiment 10, 40 parts of polyether polyol taking saccharose as an initiator, 1.5 parts of foam stabilizer, 2 parts of water, 25 parts of foamer and 1.5 parts of catalyst (N,N-dimethylcyclohexylamine); and A component B includes 130 parts of isocyanate.

A preparation method of the flame-retardant polyurethane material is the same as that in the embodiment 17.

Embodiment 19

The present embodiment provides a flame-retardant polyurethane material. In parts by mass, a component A of raw materials for synthesizing the flame-retardant polyurethane material includes:

30 parts of the flame-retardant polyether polyol prepared in the embodiment 11, 70 parts of polyether polyol taking sorbitol as an initiator, 2.0 parts of foam stabilizer, 2 parts of water, 20 parts of foamer and 1.5 parts of catalyst (N,N'-dimethylpyridine); and A component B includes 125.5 parts of isocyanate.

A preparation method of the flame-retardant polyurethane material is the same as that in the embodiment 17.

Embodiment 20

The present embodiment provides a flame-retardant polyurethane material. In parts by mass, a component A of raw materials for synthesizing the flame-retardant polyurethane material includes:

15 parts of the flame-retardant polyether polyol prepared in the embodiment 12, 85 parts of polyether polyol taking sorbitol as an initiator, 2 parts of foam stabilizer, 2 parts of water, 25 parts of foamer and 1.5 parts of catalyst (N,N-dimethylbenzylamine); and A component B includes 130.5 parts of isocyanate.

A preparation method of the flame-retardant polyurethane material is the same as that in the embodiment 17.

Embodiment 21

The present embodiment provides a flame-retardant polyurethane material. In parts by mass, a component A of raw materials for synthesizing the flame-retardant polyurethane material includes:

70 parts of the flame-retardant polyether polyol prepared in the embodiment 13, 30 parts of polyether polyol taking sorbitol as an initiator, 1.5 parts of foam stabilizer, 2 parts of water, 25 parts of foamer and 1.5 parts of catalyst (N,N-dimethylcyclohexylamine); and A component B includes 130 parts of isocyanate.

A preparation method of the flame-retardant polyurethane material is the same as that in the embodiment 17.

Embodiment 22

The present embodiment provides a flame-retardant polyurethane material. In parts by mass, a component A of raw materials for synthesizing the flame-retardant polyurethane material includes:

30 parts of the flame-retardant polyether polyol prepared in the embodiment 14, 70 parts of polyether polyol taking saccharose as an initiator, 2.0 parts of foam stabilizer, 2 parts of water, 20 parts of foamer and 1.5 parts of catalyst (N,N-dimethylcyclohexylamine); and A component B includes 125.5 parts of isocyanate.

A preparation method of the flame-retardant polyurethane material is the same as that in the embodiment 17.

Embodiment 23

The present embodiment provides a flame-retardant polyurethane material. In parts by mass, a component A of raw materials for synthesizing the flame-retardant polyurethane material includes:

70 parts of the flame-retardant polyether polyol prepared in the embodiment 15, 30 parts of polyether polyol taking saccharose as an initiator, 1.5 parts of foam stabilizer, 2 parts of water, 20 parts of foamer and 1.5 parts of catalyst (N,N-dimethylbenzylamine); and A component B includes 125 parts of isocyanate.

A preparation method of the flame-retardant polyurethane material is the same as that in the embodiment 17.

Embodiment 24

The present embodiment provides a flame-retardant polyurethane material. In parts by mass, a component A of raw materials for synthesizing the flame-retardant polyurethane material includes:

30 parts of the flame-retardant polyether polyol prepared in the embodiment 16, 60 parts of polyether polyol taking saccharose as an initiator, 2.5 parts of foam stabilizer, 2 parts of water, 25 parts of foamer and 2 parts of catalyst (N,N-dimethylbenzylamine); and A component B includes 131.5 parts of isocyanate.

A preparation method of the flame-retardant polyurethane material is the same as that in the embodiment 17.

Embodiment 25

The present embodiment provides a polyurethane material. In parts by mass, a component A of raw materials for synthesizing the polyurethane material includes:

100 parts of polyether polyol taking saccharose as an initiator, 2.5 parts of foam stabilizer, 2 parts of water, 20 parts of foamer and 2 parts of catalyst (N,N'-dimethylpyridine); and A component B includes 126.5 parts of isocyanate.

A preparation method of the polyurethane material is the same as that in the embodiment 17.

Experimental Example 1

Testing on product performance of the polyurethane materials of the embodiments 17-25: apparent density of the flame-retardant polyurethane materials is assayed according to GB 6343-1986; an oxygen index is assayed according to GB/T 2406-1993; compression strength is tested according to GB 8813-1988, dimensional stability of rigid foam is tested at low temperature according to GB/T 8811-1988, and test results are shown in a table 1.

TABLE 1

Test on product performance of flame-retardant polyurethane materials

| Flame-retardant polyurethane materials | Cream time/s | Gel time/s | Non-sticky time/s | Density/ Kg/m$^3$ | Compression strength (deformation 10%)/kPa | Dimensional stability (70° C., 48 h)/% | Oxygen index | Flame-retardant Rating |
|---|---|---|---|---|---|---|---|---|
| Embodiment 17 | 9 | 41 | 79 | 25 | 150 | <1.0 | 32 | $B_1$ |
| Embodiment 18 | 12 | 46 | 84 | 27 | 162 | <1.0 | 29 | $B_1$ |
| Embodiment 19 | 14 | 47 | 86 | 28 | 165 | <1.0 | 26 | $B_2$ |
| Embodiment 20 | 19 | 53 | 90 | 31 | 170 | <1.0 | 24 | $B_2$ |
| Embodiment 21 | 8 | 41 | 74 | 26 | 157 | <1.0 | 32 | $B_1$ |
| Embodiment 22 | 20 | 64 | 103 | 31 | 172 | <1.0 | 25 | $B_2$ |
| Embodiment 23 | 9 | 42 | 76 | 26 | 160 | <1.0 | 32 | $B_1$ |
| Embodiment 24 | 13 | 45 | 82 | 27 | 162 | <1.0 | 25 | $B_2$ |
| Embodiment 25 | 24 | 74 | 117 | 31 | 140 | <1.0 | 21 | $B_3$ |

Known from the above table 1, the flame-retardant polyurethane materials prepared in the embodiments 17-24 of the present disclosure have high compression strength, dimensional stability and oxygen indexes, flame-retardant ratings thereof are high, and the time required for emulsification and gelatination is short. It is indicated that flame retardance of polyurethane materials synthesized by using the flame-retardant polyether polyol provided by the present disclosure is effectively improved, and the materials are accompanied with high mechanical properties; and known from the table 1, after a use proportion of the flame-retardant polyether polyol is increased, reactivity of a system can be obviously improved, and flame retardance of the prepared flame-retardant polyurethane materials is also further improved.

Apparently, the above-mentioned embodiments are only intended for clearly describing made examples, rather than defining embodiments. For those having ordinary skill in the art, changes or variations of other different forms can also be made on the basis of the above-mentioned description. Herein, all embodiments are not required to and cannot be exhaustive. Readily apparent changes or variations evolved therefrom still fall within the protection scope of the present disclosure.

The invention claimed is:

1. A flame-retardant polyether polyol synthesized from raw materials comprising a Mannich base and an epoxide, wherein the epoxide includes one or more of ethylene oxide, propylene oxide and butylene oxide; and wherein the Mannich base has a structure represented by a formula (II):

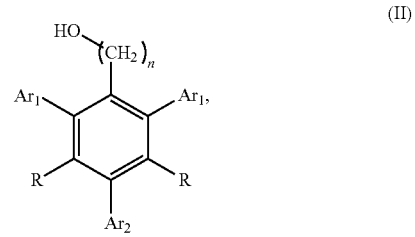

(II)

wherein, n is an integer of 1-16, R is

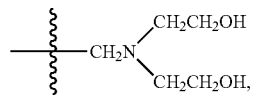

and $Ar_1$ and $Ar_2$, independently of each other, represent bromo or chloro.

2. The flame-retardant polyether polyol according to claim 1, wherein the Mannich base has a structure represented by any one of following formulae:

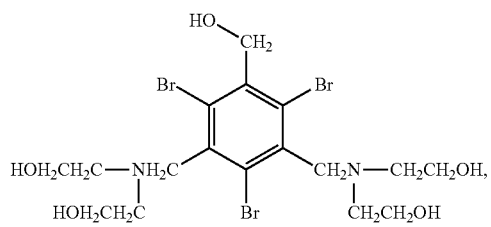

(I-4)

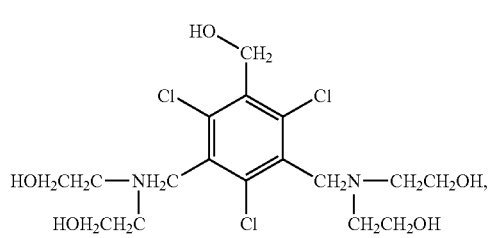

(I-5)

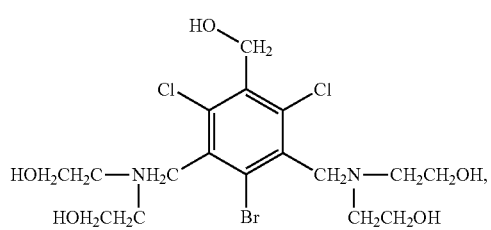

(I-6)

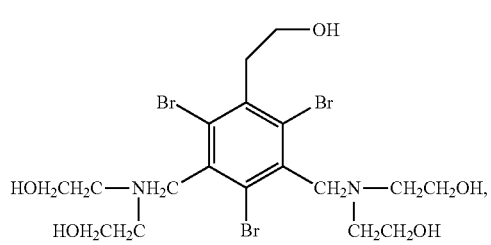

(I-7)

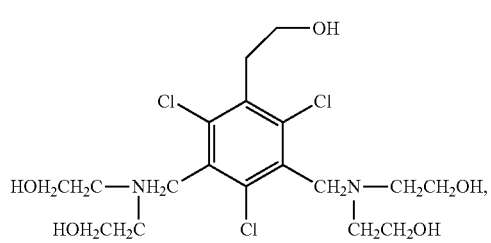

(I-8)

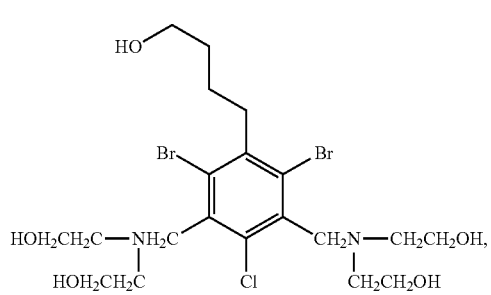

(I-9)

-continued

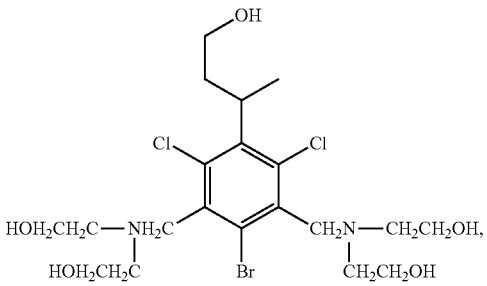

(I-10)

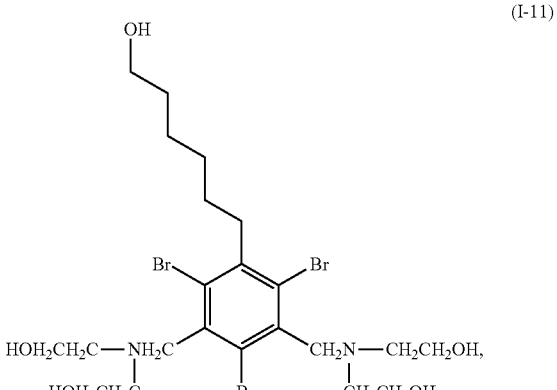

(I-11)

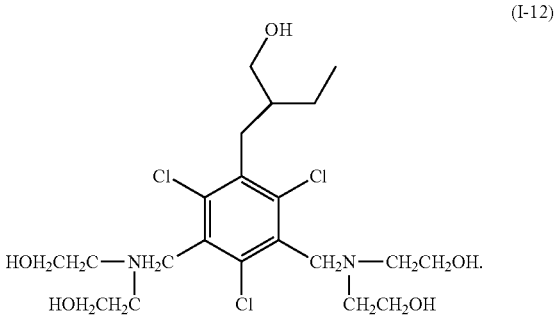

(I-12)

3. The flame-retardant polyether polyol according to claim 1, wherein the flame-retardant polyether polyol has a hydroxyl value of 20-900 mgKOH/g.

4. A preparation method of the flame-retardant polyether polyol according to claim 1, comprising the following steps:
   (1) mixing the Mannich base with a structure represented by the formula (II) with a basic catalyst in an oxygen-free environment to produce a mixture;
   (2) performing a polymerization reaction by introducing an epoxide to the mixture to produce a precursor of the flame-retardant polyether polyol; wherein the epoxide is one or more selected from the group consisting of ethylene oxide, propylene oxide and butylene oxide; and
   (3) dewatering the precursor of the flame-retardant polyether polyol in a vacuum environment, followed by neutralizing treatment to produce the flame-retardant polyether polyol.

5. The preparation method according to claim 4, wherein the mixture produced in step (1) by mixing the Mannich base with the basic catalyst in the oxygen-free environment is heated up to a temperature of 80-85° C. to produce a heated mixture, and
   the epoxide is introduced into the heated mixture to perform the polymerization reaction in step (2) at a reaction temperature of 85-100° C. for a period of 1-1.5 h; and in step (3), the precursor of the flame-retardant polyether polyol is dewatered at a temperature of 90-100° C. for a period of 0.5-1 h, and then, glacial acetic acid is added thereto for performing a neutralizing treatment.

6. The preparation method according to claim 4, wherein a molar ratio of the Mannich base to the epoxide is 1:(1-200).

7. A method for preparing a flame-retardant polyurethane material from the flame-retardant polyether polyol according to claim 1.

8. A flame-retardant polyurethane material, synthesized from raw materials comprising the flame-retardant polyether polyol according to claim 1 and an isocyanate.

9. The flame-retardant polyurethane material according to claim 8, wherein the flame-retardant polyether polyol accounts for 30-70 parts by mass, and the isocyanate accounts for 125-131.5 parts by mass.

10. The flame-retardant polyurethane material according to claim 8, wherein in parts by mass, the raw materials of the flame-retardant polyurethane material further comprise 30-70 parts of non-flame-retardant polyether polyol.

11. The flame-retardant polyurethane material according to claim 8, wherein in parts by mass, the raw materials of the flame-retardant polyurethane material further comprise 1.5-2.5 parts of foam stabilizer, 20-25 parts of foamer and 1.5-2 parts of catalyst.

12. The flame-retardant polyether polyol according to claim 1, wherein a mole ratio of the Mannich base to the epoxide is 1:(1-200).

\* \* \* \* \*